(12) United States Patent
Tsai

(10) Patent No.: US 7,869,546 B2
(45) Date of Patent: Jan. 11, 2011

(54) MULTICODE TRANSMISSION USING WALSH HADAMARD TRANSFORM

(75) Inventor: Shiau-He Shawn Tsai, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1719 days.

(21) Appl. No.: 11/067,874

(22) Filed: Feb. 28, 2005

(65) Prior Publication Data

US 2006/0067413 A1 Mar. 30, 2006

Related U.S. Application Data

(60) Provisional application No. 60/614,953, filed on Sep. 30, 2004.

(51) Int. Cl.
*H03D 1/00* (2006.01)

(52) U.S. Cl. ............... 375/343; 375/150; 375/130; 375/233; 375/141; 375/267

(58) Field of Classification Search ............... 375/147, 375/260, 343
See application file for complete search history.

(56) References Cited

U.S. PATENT DOCUMENTS

| | | | |
|---|---|---|---|
| 6,175,588 B1 * | 1/2001 | Visotsky et al. ............ 375/148 |
| 7,116,723 B2 * | 10/2006 | Kim et al. ................... 375/267 |
| 7,133,433 B2 * | 11/2006 | Jalloul et al. ............... 375/141 |
| 7,394,865 B2 * | 7/2008 | Borran et al. ............... 375/295 |
| 2003/0165131 A1 * | 9/2003 | Liang et al. ................. 370/342 |
| 2004/0082356 A1 * | 4/2004 | Walton et al. ............... 455/522 |
| 2004/0098433 A1 * | 5/2004 | Narayan et al. ............. 708/410 |
| 2006/0067382 A1 * | 3/2006 | Yedidia et al. .............. 375/141 |
| 2008/0291972 A1 * | 11/2008 | Chin Po Shin et al. ...... 375/130 |

OTHER PUBLICATIONS

Baum et al., "Cyclic-Prefix CDMA: An Improved Transmission Method for Broadband DS-CDMA Cellular Systems," 2002 IEEE, Mar. 17, 2002, pp. 183-188, XP10585759.

Lin et al., "Low Complexity Frequency-Domain Despreading for Cyclic-Prefix CDMA Systems," 2004 IEEE, Jun. 2004, pp. 339-341, XP001200664.

Usakova, A. and Kotuliakova, J., "Using Discrete Orthogonal Transform for Convolution"; Journal of Electrical Engineering; 2002; pp. 285-288; vol. 53; No. 9-10.

* cited by examiner

*Primary Examiner*—Shuwang Liu
*Assistant Examiner*—Dhaval Patel
(74) *Attorney, Agent, or Firm*—Coats & Bennett, P.L.L.C.

(57) ABSTRACT

A symbol sequence contained in a received signal comprising a cyclic convolution of a Walsh code multiplexed signal and a channel impulse response of a multipath channel is detected using Walsh Hadamard domain equalization techniques. The method comprises converting the received signal and the channel impulse response of the multipath channel from the time domain to the WHT domain, and determining the symbol sequence based on equalizing the received signal in the WHT domain using WHT spectra of the channel impulse response to remove inter-symbol interference from the received signal due to cross-correlation between Walsh codes.

14 Claims, 3 Drawing Sheets

MULTICODE TRANSMISSION USING WALSH HADAMARD TRANSFORM

RELATED APPLICATIONS

This application claims priority to the U.S. provisional application filed on 30 Sep. 2004, and assigned Ser. No. 60/614,953, which is incorporated herein by reference.

BACKGROUND OF THE INVENTION

The present invention relates generally to equalization techniques and equalizers for wireless communication systems, and more particularly, to Walsh Hadamard Transform domain equalization and equalizers.

Code Division Multiple Access (CDMA) systems, such as wireless communication networks, generate individual code channels using orthogonal code sets, such as Walsh codes. Multiple code channels generally are spread onto the same carrier frequency and transmitted as a combined signal. An individual receiver may recover selected ones of the individual code channels by correlating the combined received signal with the corresponding code(s).

Effective recovery of the individual code channels by the receivers depends on the orthogonality of the codes. Unfortunately, the typical transmission channel is time dispersive—i.e., multipath—and there is some loss of code orthogonality in the received signal, which represents a time-domain linear convolution of the transmitted signal and the transmission channel's impulse response. The impairment of code orthogonality, referred to as inter-path interference, compromises a receiver's ability to separate individual code channels from the combined signal.

The RAKE receiver is one type of communication receiver adapted for multipath reception, and it finds common use in CDMA systems. RAKE receivers offer the capability of resolving multipath components in a received signal. The typical RAKE receiver includes a plurality of RAKE fingers, and each RAKE finger detects a different multipath component using a correlation process that treats all other multipath components as interference. The RAKE receiver then computes a weighted sum of the individually detected multipath components according to maximal ratio combining principles to generate the RAKE output signal.

However, the ability of a RAKE receiver to resolve inter-path interference arising from multipath reception is limited. More particularly, RAKE receivers depend on bandwidth expansion (spread spectrum) to provide inter-path interference suppression. If the inter-path interference is not suppressed sufficiently, the RAKE receiver's diversity combining performance will be degraded. The residual, irreducible interference limits the achievable data rate for Walsh code multiplexed CDMA systems.

Other receiver types may offer performance advantages over RAKE receivers. For example, transmit/receive methods based on Orthogonal Frequency Division Multiplexing (OFDM) have been recognized for their capability of equalizing frequency-selective distortions using simple one-tap divisions in the frequency domain. Indeed, frequency domain equalization (FDE) is one feature that distinguishes OFDM receiver performance from that of a Walsh code multiplexed CDMA system that conventionally requires a RAKE receiver first to resolve the multiple signal components in a multipath signal and then combine them for diversity.

In contrast, an OFDM receiver does not need to resolve multipath components explicitly; rather it directly compensates the frequency-selective distortion of the multipath transmission channel in the Fourier transform domain (the frequency domain). Such operation exploits the duality existing between the linear time convolution of the transmitted signal and the transmission channel's impulse response and Fourier transform domain processing. Time-domain convolution equates to frequency domain multiplication, although an actual OFDM receiver may use one-tap division operations rather than de-convolution to perform frequency domain equalization of the received signal. Further, an OFDM receiver may use Discrete Fourier Transform (DFT) or Fast Fourier Transform (FFT) for received signal processing. The duality property of the DFT or the FFT has a slight difference, i.e., time-domain cyclic convolution corresponds to frequency domain point-wise multiplication.

Cyclic convolution does not naturally occur in signal transmission, which fundamentally is a linear convolution of the transmitted signal and the channel response, but it can be mimicked by manipulating the transmitted signal such that certain portions of it are repeated. These repeated portions of the transmitted signal sometimes are referred to as cyclic prefixes. When the cyclic prefixed transmit signal passes through the multipath channel, the linear convolution of channel impulse response will produce a received signal with a portion that is equivalent to cyclic convolution. Such operations are exploited in OFDM receiver processing based on the above-mentioned and well-known duality relationship between cyclic convolution in the time domain and point-wise multiplication in the discrete frequency domain.

However, while OFDM-based signal processing may offer certain performance advantages over RAKE-based processing in Walsh code multiplexed CDMA systems, it is not without its disadvantages. For example, OFDM signal transmission and reception requires fundamentally different transmitter and receiver structures to support OFDM's use of multiple carrier frequencies. Further, OFDM-based processing is not trivial. Other transmission and reception frameworks may offer the advantages of improved multipath equalization performance without requiring any fundamental departure from the basic transceiver architectures used in existing CDMA systems.

For example, transmitting signals based on Walsh code multiplexing can offer the equalization performance advantages of OFDM with the benefit of potentially simplified signal processing, while simultaneously complementing existing CDMA transmission methods. That is, with Walsh code multiplexed CDMA systems, the orthogonal basis functions are Walsh-Hadamard codes meaning that signal processing requires simple addition and subtraction operations, while in OFDM the basis functions are sinusoids meaning that signal processing requires more compute-intensive signal processing operations.

However, one problematic aspect of signal processing in the Walsh-Hadamard Transform (WHT) domain is the complicated and poorly understood relationship between the WHT domain processing corresponding to the time-domain convolution of the transmit signal and the channel impulse response and WHT domain. That is, conceptually, Walsh-Hadamard transforms and Fourier transforms both are based on orthogonal bases and have certain duality properties in the transform domain. For Fourier transform, the convolution theorem is well known, but such is not the case for the WHT domain. Therefore, the receiver operations needed for mitigating inter-path interference—i.e., cross correlations between the Walsh codes used to generate the transmitted data signal—can be difficult to discern or implement.

SUMMARY OF THE INVENTION

The present invention provides a method and apparatus to detect a symbol sequence contained in a received signal comprising a cyclic convolution of a Walsh code multiplexed signal and the channel impulse response. The receiver employs Walsh Hadamard transform (WHT) domain equalization techniques to remove/mitigate channel impairments resulting from cross-correlation between asynchronous Walsh codes introduced by multipath fading.

In one or more embodiments, a receiver includes one or more processing circuits that are configured to perform received signal equalization in the WHT domain, thereby mitigating inter-path interference in the received signal. Thus, in at least one embodiment, an equalizer circuit is configured to calculate a transformation matrix that relates the WHT domain spectra of the (transmitted) data signal and the WHT domain spectra of the channel impulse response to the received signal. Multiplying the received signal by the (inverse) transformation matrix yields the modulation symbols corresponding to the Walsh codes with inter-symbol interference between modulation symbols due to cross-correlation between asynchronous Walsh codes removed.

Thus, in at least one embodiment, a communication device, such as a mobile station, is configured with a receiver circuit that is configured to receive a Walsh code multiplexed signal, and to recover the originally transmitted data from that signal based on performing WHT-domain signal equalization wherein the effects of inter-path interference are mitigated. Notably, the equalization processing exploits the fact that the results of time domain cyclic convolution are equivalent to dyadic convolution at selected points, and that dyadic convolution corresponds to the element-by-element Walsh-Hadamard products used in carrying out the WHT-domain signal equalization. Thus, processing of the received signal effectively uses similarity transforms to obtain dyadic convolution results with a combination of their selected points corresponding to all data points in the received signal.

Of course, those skilled in the art will appreciate that the signal processing described above may be varied without departing from the present invention's broader scope of mitigating inter-path interference via WHT-domain signal equalization. As such, the present invention is not limited to the above features and advantages. Indeed, those skilled in the art will recognize additional features and advantages upon reading the following detailed description and upon viewing the accompanying drawings.

DETAILED DESCRIPTION OF THE INVENTION

Figure 1:
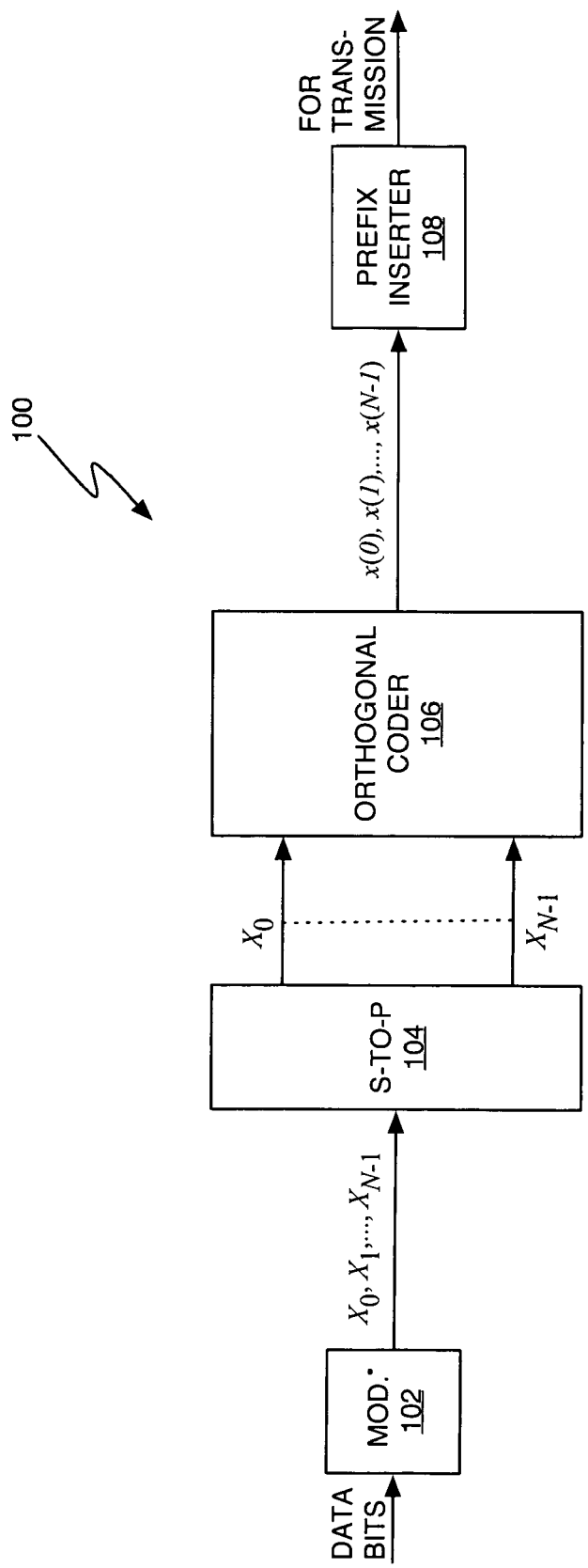
FIG. 1 illustrates a transmitter according to one exemplary embodiment of the present invention.

The present invention provides a method and apparatus to perform Walsh-Hadamard transform (WHT) domain equalization of a received signal comprising a cyclic convolution of a Walsh code multiplexed signal and the channel impulse response. Walsh code equalization provides a means to remove/mitigate channel impairments resulting from cross-correlation between asynchronous Walsh codes introduced by multipath fading.

Broadly, at an appropriately configured transmitter, a modulation symbol stream is divided into a plurality of substreams at the transmitter and the substreams are Walsh code multiplexed for transmission to the receiver. In at least one embodiment, the transmit signal comprises N-length transform blocks, wherein each block includes N modulation symbols, each impressed onto a different Walsh code. Further, a cyclic prefix is appended to the Walsh code multiplexed signal before transmission, so that the linear convolution between the transmitted signal and the impulse response of the transmission channel mimics cyclic convolution after the cyclic prefixed portion is removed at the receiver.

With that transmission method, the signal received by an appropriately configured receiver effectively is a time-domain cyclic convolution of the original data signal and the channel's impulse response. In the WHT domain, the received signal is a compound function of the WHT domain spectra of the channel impulse response and the WHT domain spectra of the original data signal—the individual modulation symbols. The processing goal thus is the recovery of each modulation symbol by using the corresponding inverse compound function, wherein the effects of inter-path interference have been removed or at least substantially mitigated.

The receiver achieves that processing goal by functionally exploiting the fact that WHT domain Hadamard products correspond to dyadic convolution, and that dyadic convolution is equivalent to cyclic convolution at selected points. Thus, by providing the appropriately configured receiver with a time-domain received signal that effectively represents the cyclic convolution of the originally transmitted signal and the transmission channel's impulse response, the relationship between cyclic convolution and dyadic convolution may be exploited to drive the WHT domain processing used by the receiver to mitigate inter-path interference in the received signal.

More particularly, by appending a cyclic prefix to the Walsh code multiplexed signal at the transmitter, the receiver can equalize the received signal using a transformation matrix that relates the Hadamard product of the WHT domain spectra of the data signal and the WHT domain spectra of the channel impulse response to the received signal. The below discussion illustrates one or more transmitter and receiver embodiments, and provides non-limiting examples of the signal processing that may be used to generate an appropriate transformation matrix, and to use such matrixes for the recovery of originally transmitted data from the received signal.

FIG. 1 illustrates a transmitter 100 according to one embodiment of the present invention. The transmitter 100 comprises a modulator, 102, a serial-to-parallel converter 104, an orthogonal coder 106 (also referred to herein as a "coding circuit"), and a prefix insertion unit 108 (also referred to herein as a "prefix insertion circuit"). The modulator 102 receives an input bitstream and maps the input bits to complex-valued modulation symbols. The modulator 102 may comprise a QPSK, 8-PSK, or QAM modulator. The symbol stream output by the modulator 102 has a symbol rate R. The serial-to-parallel converter 104 converts the rate R symbol stream output by the modulator 102 into N parallel substreams $S_0, \ldots, S_{N-1}$ as shown in Table 1 below. Each column in Table 1 represents a substream $S_n$ with a symbol rate equal to R/N. Each row in Table 1

TABLE 1

Serial to parallel conversion of data symbols

| $S_0$ | $S_1$ | $S_2$ | $S_3$ | |
|---|---|---|---|---|
| $X_0$ | $X_1$ | $X_2$ | $X_3$ | $\underline{X}_0$ |
| $X_4$ | $X_5$ | $X_6$ | $X_7$ | $\underline{X}_1$ |
| $X_8$ | $X_9$ | $X_{10}$ | $X_{11}$ | $\underline{X}_2$ |
| $X_{12}$ | $X_{13}$ | $X_{14}$ | $X_{15}$ | $\underline{X}_3$ | represents one input symbol vector $\underline{X}$ to the orthogonal coder 106, which may be viewed as the WHT spectra of a data signal x transmitted to the receiver 200. The orthogonal coder 106 orthogonally codes the substreams by performing an inverse WHT to convert the input symbol vector $\underline{X}$ to a time domain, Walsh multiplexed data signal denoted $x=[x(0), x(1), \ldots x(N-1)]^T$.

The WHT and its inverse are well-known orthogonal transforms based on Walsh functions. The discrete Walsh Hadamard transform pair is given by:

$$X_k = \frac{1}{N}\sum_{n=o}^{N-1} x(n)w_k(n) \text{ for } k = 0, 1, \ldots, N-1 \qquad \text{Eq. (1)}$$

$$x(n) = \sum_{n=0}^{N-1} X_k w_k(n) \text{ for } k = 0, 1, \ldots, N-1 \qquad \text{Eq. (2)}$$

where $x=[x(0), x(1), \ldots x(N-1)]^T$ is the input signal for the WHT. As shown in Equation 1, the Hadamard spectrum coefficient $X_k$ for a given Walsh code $w_k$ is computed by multiplying each time sample $x(n)$ of the Walsh code multiplexed signal x by a corresponding element $w_k(n)$ of the Walsh code $w_k$ and summing the results. The WHT spectrum $\underline{X}$ for all N WHT components (i.e., Walsh codes) may be expressed in vector form by:

$$\underline{X}=[X_0 X_1 \ldots X_{N-1}]^T \qquad \text{Eq. (3)}$$

It should be noted that the WHT spectrum in Equation 3 corresponds to the input symbol vector $\underline{X}$ to the orthogonal coder 106.

The output of the orthogonal coder 106 is a N component Walsh code multiplexed signal x. The data signal x is also referred to herein as a transform block since it represents a block corresponding to one IWHT transform operation. The prefix insertion unit 108 adds a cyclic prefix to the data signal x to mimic cyclic convolution. The cyclic prefix is formed by copying a predetermined portion of the data signal x, e.g., the last M symbols of the data signal x, and appending it to the front of the block. The length of the cyclic prefix should be determined by the delay spread of the channel. In a preferred embodiment of the invention, the length of the cyclic prefix is selected so that interference between adjacent transform blocks is eliminated once the cyclic prefix is removed at the receiver 200. The data signal x with the cyclic prefix appended is then modulated onto a radio frequency carrier and transmitted.

Figure 2:
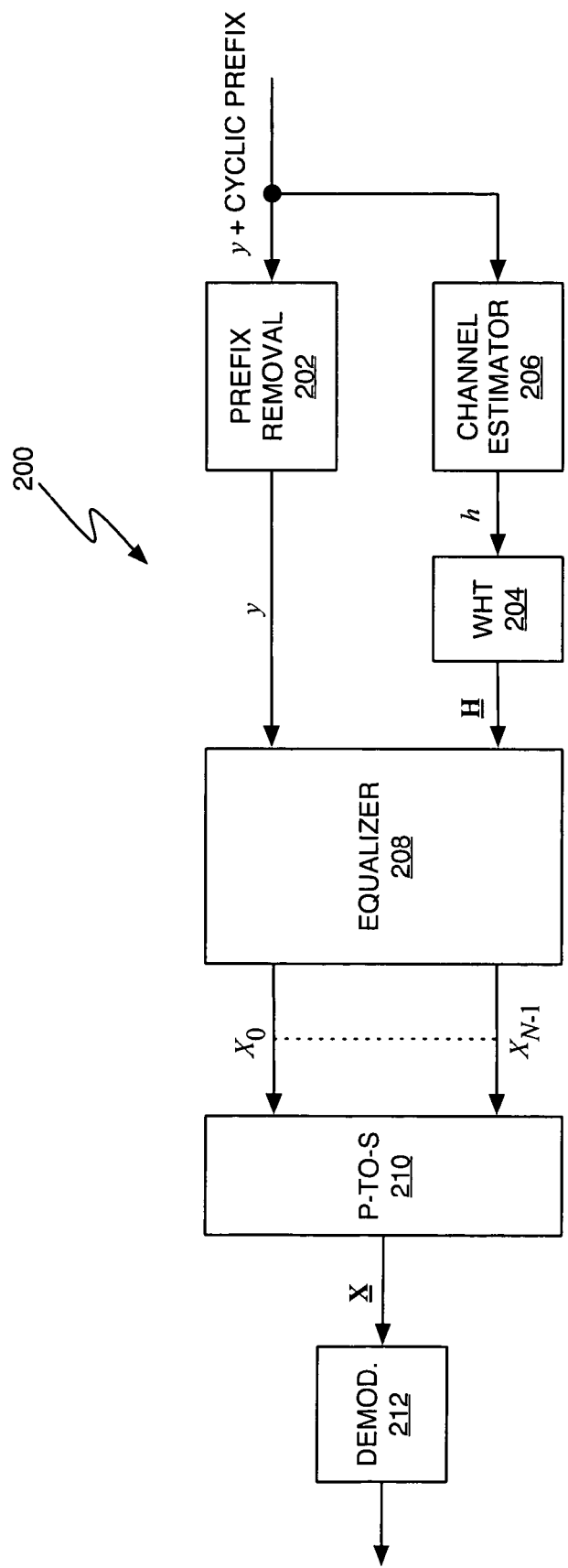
FIG. 2 illustrates a receiver according to one exemplary embodiment of the present invention.

Referring now to FIG. 2, the receiver 200 includes a prefix removal unit 202, an orthogonal decoder 204, a channel estimator 206, an equalizer 206, and a parallel-to-serial converter 210. The receiver 200 may comprise all or part of a wireless communication transceiver for use in a wireless communication network. By way of non-limiting examples, the receiver 200 can be included in a cellular telephone or, more generally, a "mobile station," in a Portable Digital Assistant (PDA), in a laptop/palmtop computer, or essentially any other type of wireless communication device or system.

Regardless, in operation, the prefix removal unit 202 removes the cyclic prefix from the received signal $y=[y(0), y(1), \ldots y(N-1)]^T$, which is also referred to herein as the channel output vector. The received signal y (the observed channel output vector) is input to the equalizer 208. As is detailed later herein, the equalizer 208 can be implemented using hardware, software, or any combination thereof. In at least one embodiment, at least the equalizer 208 of receiver 200 comprises one or more processing circuits configured to carry out WHT domain processing of the received signal for the mitigation of inter-path interference.

In any case, the channel estimator 206 generates an estimate of the channel impulse response $h=[h(0), h(1), \ldots h(N-1)]$. The channel estimates may be obtained in a conventional manner. One method is to insert a training sequence known to the receiver 200 into the transmitted signal. The channel estimator 206 can use the training sequence to estimate the channel.

The channel impulse response h is also converted to the WHT domain by a WHT transformer 204 to obtain the WHT spectra of the channel impulse response h. The WHT spectra of the channel impulse response, denoted as $\underline{H}$, is referred to herein as the WHT channel response vector. The received signal y is a cyclic convolution of the data signal and the channel impulse response h of the communication channel. The received signal y can be expressed in mathematical terms as:

$$y=x*h \qquad \text{Eq. (4)}$$

where * denotes cyclic convolution.

Equalizer 208 performs a mix of time-domain and WHT domain processing to estimate $\underline{X}$ based on the channel output vector y and the WHT domain channel response vector $\underline{H}$. As detailed herein, that processing removes, or at least reduces, the effects of the Walsh code cross-correlations arising from multipath reception. The estimation of $\underline{X}$ recovers the original modulation symbols as output by modulator 102 in the transmitter 100.

The WHT spectrum of the channel output vector y will not be a direct element-by-element product, i.e. Hadamard product, of $\underline{X}$ and $\underline{H}$. The element-by-element product of $\underline{X}$ and $\underline{H}$ in the WHT domain corresponds to the dyadic convolution of the data signal x and the channel impulse response h in the time domain, which is denoted as y'. The relationship between the time domain dyadic convolution and the Hadamard product of $\underline{X}$ and $\underline{H}$ is given by:

$$y' \xleftrightarrow{\text{WHT}} \underline{X} \odot \underline{H} \qquad \text{Eq. (5)}$$

where ⊙ denotes the Hadamard product. The Hadamard product of two vectors is the element-by-element multiplication of the vectors. The WHT channel response vector $\underline{H}$ is obtained by transforming the channel impulse response h, which can be estimated, for example, using pilot signals/symbols, training sequences, etc. If the dyadic convolution y' of the data signal x and the channel impulse response h could be determined from the channel output vector y, then the WHT symbol vector $\underline{X}$ could be easily calculated. However, dyadic convolution does not occur in the communication channel. Instead, with use of cyclic prefixes at transmitter 100, the receiver 200 receives the transmitted signal as a cyclical convolution of the data signal x and the channel impulse response h.

The present invention employs a WHT equalization technique that is based on the relationship between dyadic convolution and cyclic convolution. Dyadic convolution of the data signal x and the channel impulse response h coincides with the cyclic convolution at two points: the middle point of the data signal and the end point of the data signal, e.g., the middle and end points of a N-point transform block of the received signal are equivalent to dyadic convolution of the data signal before transmission and the channel impulse response. Thus, for an N-point cyclic convolution of the data signal x and the channel impulse response h, the resulted values at the N/2-th and N-th positions will be identical to those of an N-point dyadic convolution of the data signal x and the channel impulse response h. Using the identical results at these two points, it is possible to relate the Hadamard product of the WHT domain spectra of the data signal and the WHT domain spectra of the channel impulse response to the received signal. This relationship may be expressed in a transformation matrix $T(\underline{H})$ that multiplies the WHT spectra of the data signal, which as stated earlier corresponds to the desired modulation symbols, to yield the received signal.

The relationship of the Hadamard product of the WHT domain spectra of the data signal and the WHT domain spectra of the channel impulse response to the received signal vector y is given by:

$$y = T(\underline{H}) \cdot \underline{X} \quad \text{Eq. (6)}$$

where $$T(\underline{H}) = \frac{1}{N} \sum_{i=0}^{\frac{N}{2}-1} J^{(i)} W(\Xi \odot A^{(i)}) \quad \text{Eq. (7)}$$

Solving Equation 6 for $\underline{X}$ yields:

$$\underline{\ddot{X}} = [T(\underline{H})]^{-1} y \quad \text{Eq. (8)}$$

In Equation 7, the term $\Xi$ is a one-dimensional expansion of the WHT channel response vector $\underline{H}$ given by $\Xi = \underline{H} \cdot 1^T$ where $1^T$ is an N-by-1 all-one vector. Thus, the term $\Xi$ can be computed from the channel impulse response. The term $A^{(i)}$ is a similarity transform matrix in the WHT domain that performs the equivalent of a time domain cyclic shift. The operator ⊙ means the Hadamard product, i.e., the element-by-element multiplication of two matrices. The term W is the Walsh Hadamard transform matrix that transforms the product $\Xi \odot A^{(i)}$ to the time domain. The term $J^{(i)}$ is a selection matrix that selects two rows of the matrix $W(\Xi \odot A^{(i)})$. The terms $J^{(i)}$, W, and $A^{(i)}$ are known. Therefore, Equation 8 can be solved by the equalizer 208 to compute an estimate $\underline{\ddot{X}}$ of the WHT symbol vector $\underline{X}$.

Although a more detailed procedure for one embodiment of the above processing is given later herein, the procedure broadly consists of the following steps. First, the cyclic prefix is removed from the received signal y and the channel impulse response h is converted to the WHT domain to obtain the WHT spectra $\underline{H}$ of the channel impulse response h, referred to herein as the WHT channel response vector H. Second, the Hadamard products $\Xi \odot A^{(i)}$ of N similarity transformation matrices and the one-dimensional expansion $\Xi$ of the WHT channel response vector $\underline{H}$ are computed. The similarity transformations are equivalent to a cyclic shift in the time domain.

To better appreciate this relationship, let $x^{(i)}$ denote the cyclic shift elements of x by j, i.e., $x^{(j)}(n) = x((n-j) \mod N)$. To perform cyclic shift in the time domain, a similarity transform is performed in the WHT domain:

$$X^{(j)} \xleftrightarrow{\text{WHT}} A^j X,$$

where $$A^j = \frac{1}{N} W M^j W^T$$

and $$M = \begin{bmatrix} 0 & 0 & \cdots & 0 & 1 \\ 1 & 0 & \cdots & 0 & 0 \\ 0 & 1 & \cdots & 0 & 0 \\ \vdots & \vdots & \ddots & \vdots & \vdots \\ 0 & 0 & \cdots & 1 & 0 \end{bmatrix}_{N \times N}$$

The shifting operation is done to obtain dyadic convolution results for all N points of the received signal, y. Next, each similarity-transformed product $\Xi \odot A^{(i)}$ is inverse-transformed back to the time domain signal. This transform operation is represented in Equation 7 by the term $W(\Xi \odot A^{(i)})$. Finally, the elements of each transformed product $\Xi \odot A^{(i)}$ that correspond to cyclic convolution are selected by a selection matrix $J^{(i)}$. After scaling each selected point by $$\frac{1}{N},$$

the transformation matrix $T(\underline{H})$ is obtained.

The similarity transform makes $A^{(1)} \underline{X} \leftrightarrow x^{(1)}$. Thus, if the received signal in the time domain includes a cyclic prefix portion to mimic cyclic convolution, then the inverse WHT of $(A^{(j)} \underline{X}) \odot \underline{H}$ will have two points, N/2 and N, that are equal to $x^{(j)}(n) * h(n)$. By definition, $y'_m(N/2) = y(N/2-m) = y'(N/2)$. Thus, the selection matrix $J^{(i)}$ is defined as:

$$J^{(0)} = \begin{bmatrix} 0 & 0 & 0 & \cdots & 0 & & & & & \\ 0 & 0 & 0 & \cdots & 0 & & & & & \\ \vdots & \vdots & \vdots & \ddots & \vdots & & O_{\frac{N}{2} \times \frac{N}{2}} & & \\ 0 & 0 & 0 & \cdots & 0 & & & & & \\ 0 & 0 & 0 & \cdots & 1 & & & & & \\ & & & & & 0 & 0 & 0 & \cdots & 0 \\ & & & & & 0 & 0 & 0 & \cdots & 0 \\ & O_{\frac{N}{2} \times \frac{N}{2}} & & & & \vdots & \vdots & \vdots & \ddots & \vdots \\ & & & & & 0 & 0 & 0 & \cdots & 0 \\ & & & & & 0 & 0 & 0 & \cdots & 1 \end{bmatrix}_{N \times N},$$

$$J^{(1)} = \begin{bmatrix} 0 & 0 & 0 & \cdots & 0 & & & & & \\ 0 & 0 & 0 & \cdots & 0 & & & & & \\ \vdots & \vdots & \vdots & \ddots & \vdots & & O_{\frac{N}{2} \times \frac{N}{2}} & & \\ 0 & 0 & 0 & \cdots & 1 & & & & & \\ 0 & 0 & 0 & \cdots & 0 & & & & & \\ & & & & & 0 & 0 & 0 & \cdots & 0 \\ & & & & & 0 & 0 & 0 & \cdots & 0 \\ & O_{\frac{N}{2} \times \frac{N}{2}} & & & & \vdots & \vdots & \vdots & \ddots & \vdots \\ & & & & & 0 & 0 & 0 & \cdots & 1 \\ & & & & & 0 & 0 & 0 & \cdots & 0 \end{bmatrix}_{N \times N},$$

and $$J^{(\frac{N}{2}-1)} = \begin{bmatrix} 0 & 0 & 0 & \cdots & 1 & & & & & \\ 0 & 0 & 0 & \cdots & 0 & & & & & \\ \vdots & \vdots & \vdots & \ddots & \vdots & & O_{\frac{N}{2} \times \frac{N}{2}} & & \\ 0 & 0 & 0 & \cdots & 0 & & & & & \\ 0 & 0 & 0 & \cdots & 0 & & & & & \\ & & & & & 0 & 0 & 0 & \cdots & 1 \\ & & & & & 0 & 0 & 0 & \cdots & 0 \\ & O_{\frac{N}{2} \times \frac{N}{2}} & & & & \vdots & \vdots & \vdots & \ddots & \vdots \\ & & & & & 0 & 0 & 0 & \cdots & 0 \\ & & & & & 0 & 0 & 0 & \cdots & 0 \end{bmatrix}_{N \times N}.$$

In other words, for $j = 0 \ldots,$ $$\frac{N}{2} - 1,$$

except $$J^{(j)}_{\frac{N}{2}-j, \frac{N}{2}} = 1 \text{ and } J^{(j)}_{N-j, N} = 1,$$

all other elements of the selection matrix $J^{(j)}$ are zeros.

Thus, by simple substitution, the relationship between the cyclic time domain convolution and the WHT domain transform of $x(n)$ and $h(n)$ can be expressed as:

$$y(n) = x(n) * h(n),$$

and $$y = \frac{1}{N} \sum_{i=0}^{\frac{N}{2}-1} J^{(i)} W^T [(A^{(i)} \underline{X}) \odot \underline{H}].$$

Assuming knowledge of $\underline{H}$ from channel estimation, the receiver 200 can be configured to solve for $\underline{X}$ using N simultaneous equations.

The above processing provides a mechanism for obtaining the transformation vector $T(\underline{H})$, and solving the expression $\underline{\ddot{X}} = [T(\underline{H})]^{-1} y$ by obtaining the inverse transformation matrix using a set of N simultaneous equations. That is, the transformation matrix $T(\underline{H})$ may be generated as a sum of multiple one-dimensional expanded matrices, and the inverse of $T(\underline{H})$ then can be obtained using the well-known Sherman-Morrison algorithm with only scalar division involved in each of N steps.

Figure 3:
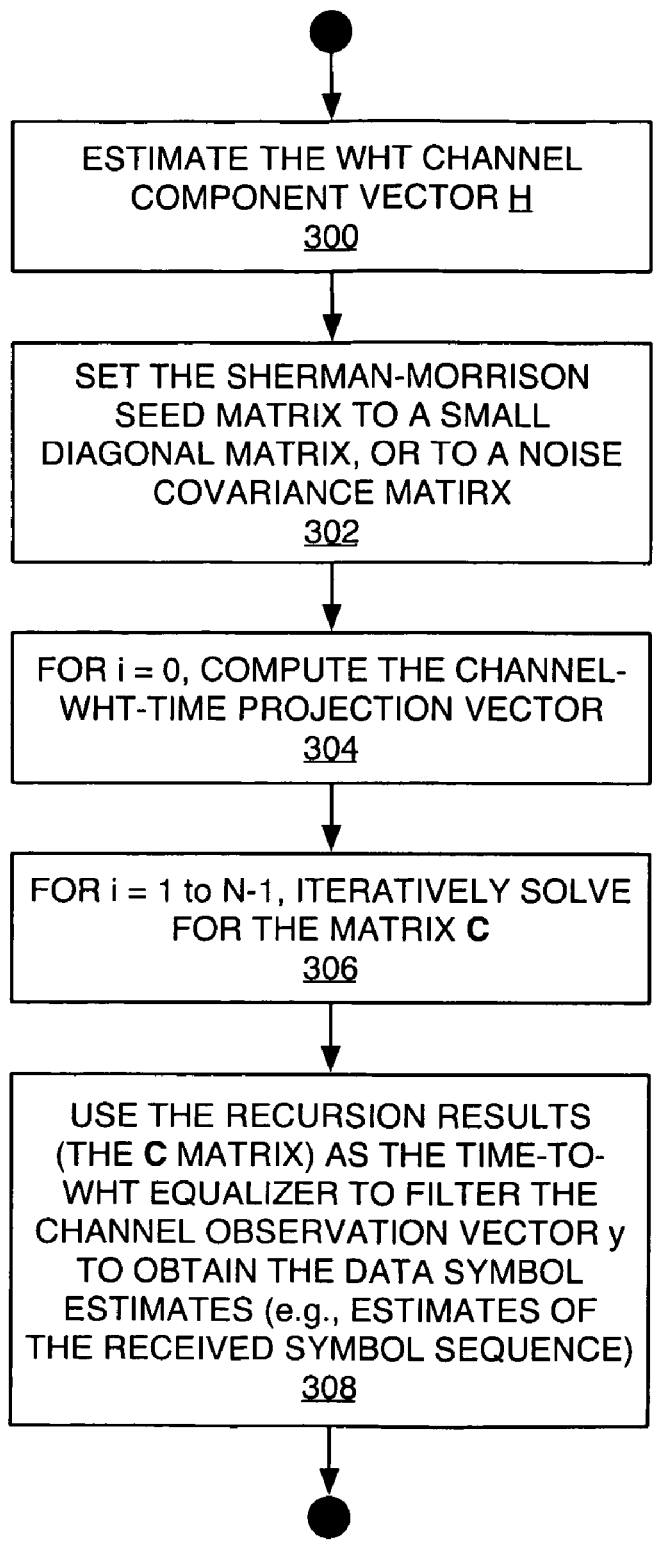
FIG. 3 illustrates receiver signal processing for mitigating inter-path interference in a Walsh code multiplexed received signal based on WHT domain signal equalization.

FIG. 3 illustrates processing logic for carrying out the above received signal processing, or variations of such processing. In particular, the illustrated logic outlines the broad processing steps for obtaining estimates of the received symbol sequence, and it should be understood that the illustrated logic can be implemented in the receiver 200 in hardware, software, or any combination thereof.

In one embodiment, the signal processing logic is implemented in the form of program instructions for execution by one or more microprocessors, Digital Signal Processors (DSPs), or other processing circuits, included within the receiver 200. In another embodiment, the signal processing logic is implemented using hardware-based processing logic and/or micro-coded processing instructions for implementation in high-speed circuits embodied within a baseband processor of the receiver 200. The baseband processor may comprise an Application Specific Integrated Circuit (ASIC) with or without a CPU core, a Field Programmable Gate Array (FPGA), a Complex Programmable Logic Device (CPLD), or some other appropriately configured logic circuit.

In any case, processing begins with estimating the WHT channel component vector $\underline{H}$ (Step 300). (The illustrated logic flow assumes that at least one "block" of the received signal is buffered at the receiver 200, or otherwise is available for processing, and that the cyclic prefix portion of the received signal has been removed.) Next, a seed matrix C, used in the Sherman-Morrison algorithm is set to $\sigma^2 I$, where $\sigma^2$ is a small number (Step 302). (The smaller $\sigma^2$ is, the closer $[T(\underline{H})]^{-1}$ is to a zero-forcing equalization.) Alternatively, the seed matrix C can be set to a noise covariance matrix in the WHT domain for Minimum Mean Square Error (MMSE) equalization. (Note that under AWGN assumptions, the noise covariance matrix is a diagonal matrix.)

Processing continues by computing the channel-WHT-time projection vector $v_0^T$ for $i=0$ (Step 304), which is detailed later herein. Let $C_0 = C + 1_0 v_0^T$, then $$C_0^{-1} = (C + 1_0 v_0^T)^{-1}$$

$$= C^{-1} + \frac{C^{-1} 1_0 v_0^T C^{-1}}{(1 + v_0^T C^{-1} 1_0)}.$$

For i=1 to N−1, based on the estimation for the channel WHT vector $\underline{H}$, processing continues with the computation of the channel-WHT-time projection vector $v_i^T$ (Step 306), which is detailed below. Let $Ci=C_{i-1}+1_i v_i^T$, then $$C_i = C_{i-1}^{-1} + \frac{C_{i-1}^{-1} 1_i v_i^T C_{i-1}^{-1}}{(1+v_i^T C_{i-1}^{-1} 1_i)}.$$

If the initial seed $\sigma^2$ is small and negligible, then $[T(\underline{H})]^{-1}=C_{N-1}$.

Finally, the recursion results—i.e., the iteratively obtained value for $[T(\underline{H})]^{-1}$—is used as the time-to-WHT equalizer to filter the channel observation vector y to obtain estimates of the received data symbol(s), $\hat{\underline{X}}$ (Step 308). Thus, $$\hat{\underline{X}}=C_{N-1}\cdot y.$$

As a final step, the parallel-to-serial converter 206 converts the estimate $\underline{X}$ to a serial symbol stream. In the absence of transmission errors, that stream is a replication of the original input symbol stream output at the transmitter 100 by the modulator 102.

In better understanding the above processing, one may examine the properties of $J^{(i)}W(\Xi\odot A^{(i)})$. Since $\Xi$ has a special form of $\underline{H}\cdot 1^T$, $$\Xi = \begin{bmatrix} H_0 & H_0 & \cdots & H_0 \\ H_1 & H_1 & \cdots & H_1 \\ \vdots & \vdots & \ddots & \vdots \\ H_{N-1} & H_{N-1} & \cdots & H_{N-1} \end{bmatrix},$$

and $J^{(i)}W$ only selects two rows of $(\Xi\odot A^{(i)})$ and moves them to different row positions, one may rewrite the selection process one row at a time instead of two rows for each similarity transform.

Let $$B^{(0)} = \begin{bmatrix} 0 & 0 & 0 & \cdots & 0 & \\ 0 & 0 & 0 & \cdots & 0 & \\ \vdots & \vdots & \vdots & \ddots & \vdots & 0_{\frac{N}{2}\times\frac{N}{2}} \\ 0 & 0 & 0 & \cdots & 0 & \\ 0 & 0 & 0 & \cdots & 1 & \\ 0_{\frac{N}{2}\times\frac{N}{2}} & & & & 0_{\frac{N}{2}\times\frac{N}{2}} \end{bmatrix},$$

$$B^{(1)} = \begin{bmatrix} 0 & 0 & 0 & \cdots & 0 & \\ 0 & 0 & 0 & \cdots & 0 & \\ \vdots & \vdots & \vdots & \ddots & \vdots & 0_{\frac{N}{2}\times\frac{N}{2}} \\ 0 & 0 & 0 & \cdots & 0 & \\ 0 & 0 & 0 & \cdots & 1 & \\ 0_{\frac{N}{2}\times\frac{N}{2}} & & & & 0_{\frac{N}{2}\times\frac{N}{2}} \end{bmatrix},$$

$$B^{(\frac{N}{2})} = \begin{bmatrix} 0_{\frac{N}{2}\times\frac{N}{2}} & 0_{\frac{N}{2}\times\frac{N}{2}} \\ & 0 & 0 & 0 & \cdots & 0 \\ & 0 & 0 & 0 & \cdots & 0 \\ 0_{\frac{N}{2}\times\frac{N}{2}} & \vdots & \vdots & \vdots & \ddots & \vdots \\ & 0 & 0 & 0 & \cdots & 0 \\ & 0 & 0 & 0 & \cdots & 1 \end{bmatrix},$$

and $$B^{(\frac{N}{2}+1)} = \begin{bmatrix} 0_{\frac{N}{2}\times\frac{N}{2}} & 0_{\frac{N}{2}\times\frac{N}{2}} \\ & 0 & 0 & 0 & \cdots & 0 \\ & 0 & 0 & 0 & \cdots & 0 \\ 0_{\frac{N}{2}\times\frac{N}{2}} & \vdots & \vdots & \vdots & \ddots & \vdots \\ & 0 & 0 & 0 & \cdots & 1 \\ & 0 & 0 & 0 & \cdots & 0 \end{bmatrix}.$$

Therefore, the j-th row of $B^{(i)}W^T$ is $w_{N/2-1}$ for j<N/2, and $w_N$ for N/2−1≤j<N−1. Therefore, the result of $J^{(i)}W^T(\Xi\odot A^{(i)})$ always has a single non-zero row, with all-zero rows in the rest of the matrix. Thus, each $B^{(i)}W^T(\Xi\odot A^{(i)})$ only contributes one dimension to the final transformation matrix $T(\underline{H})$.

The one-dimensional expansions can be analyzed by "dividing" the selection matrix $J^{(i)}$ into two single-row selection matrices, $$B^{(i)} \text{ and } B^{(i+\frac{N}{2})}.$$

For $0\leq i<N/2-1$, $B^{(i)}$ selects the N/2-th row of W and then moves the selected row up by i rows, while setting all other rows to zero as the result of the $B^{(i)}W$. For N/2≤i<N−1, $B^{(i)}$ selects the N-th row of W and then moves the selected row up by i rows, while setting all other rows to zero as the result of the $B^{(i)}W$. As a result, one may rewrite Equation 7 as, $$T(\underline{H}) = \frac{1}{N}\sum_{i=0}^{\frac{N}{2}-1} J^{(i)}W(\Xi\odot A^{(i)})$$

$$= \frac{1}{N}\sum_{i=0}^{\frac{N}{2}-1} B^{(i)}W(\Xi\odot A^{(i)}) + \sum_{i=\frac{N}{2}}^{N-1} B^{(i)}W(\Xi\odot A^{(i-\frac{N}{2})}).$$

The summation terms of the immediately above equation can be simplified. Let the selected row from W be $\overline{\omega}_i$, where $\overline{\omega}=w_{N/2-1}$ for $0\leq i<N/2-1$, and $\overline{\omega}=w_{N-1}$ for $N/2\leq i<N-1$.

The non-zero row is $$v_i^T = (\underline{H}^T\odot\overline{\omega}_i)A^i \text{ for } 0\leq i<N/2-1, \text{ and}$$

$$v_i^T = (\underline{H}^T\odot\overline{\omega}_i)A^{(i-\frac{N}{2})} \text{ for } N/2\leq i\leq N-1.$$

Then, each $B \cdot W(\Xi \odot A)$ associated with each $B^{(i)}$ can be expressed as $1_i v_i^T$, where $1_i$ referred to herein as an indicator vector, is a column vector of length N with its (i+1)-st element equal to 1 and its other elements zero. For convenience, the row vector $v_i^T$ is referred to herein as the channel-WHT-time projection vector, which projects the data symbols in the WHT domain to each time domain sample of the data signal after multipath distortion—i.e., the data samples as corrupted by inter-path interference.

With the above, then, the transformation vector $T(\underline{H})$ can be expressed in terms of outer-product vectors:

$$T(\underline{H}) = \frac{1}{N} \sum_{i=0}^{N-1} 1_i v_i^T.$$

With the above formulation for the transformation vector, the Sherman-Morrison algorithm can be applied as, $$(C+uv^T)^{-1} = C^{-1} + C^{-1}u(1+v^T C^{-1}u)^{-1}v^T C^{-1},$$

to recursively compute the inverse of the transformation matrix $T(\underline{H})$.

Of course, it should be understood that obtaining the inverse of the transformation matrix through iterative processing represents a non-limiting example that may offer computational simplicity versus some other approach to inversion. However, in one or more embodiments, the receiver 200 is configured to carry out a direct inversion of the transformation matrix. More generally, it should be understood that a variety of numerical processing methods can be employed to obtain the inversion of the transformation matrix, or at least some approximation thereof, and that the present invention is not limited to a particular method of inverting the transformation matrix.

Indeed, the present invention broadly relates to the use of WHT domain equalization to mitigate the effects of inter-path interference in a received signal comprising a Walsh code multiplexed signal. Such mitigation is based on relating the WHT domain spectra of the data signal and the WHT domain spectra of the channel impulse response to the received signal. As such, the present invention is not limited by the foregoing discussion, nor is it limited by the accompanying drawings. Rather, the present invention is limited only by the following claims and their legal equivalents.

The invention claimed is:

1. A method of detecting a symbol sequence contained in a received signal comprising a cyclic convolution of a Walsh code multiplexed signal and a channel impulse response of a multipath channel, the method comprising:

calculating a transformation matrix that relates the Walsh Hadamard Transform (WHT) domain spectra of the data signal and the WHT domain spectra of the channel impulse response to the received signal; and estimating the symbol sequence as a function of the transformation matrix and the received signal, by inverting the transformation matrix and multiplying the received signal by the inverse of the transformation matrix;

wherein calculating the transformation matrix is based on applying similarity transforms to the WHT domain spectra of the channel impulse response, wherein the similarity transforms relate the time domain cyclic convolution of the data signal and the channel impulse response to a dyadic convolution of the data signal and the channel impulse response; and wherein applying similarity transforms to the WHT domain spectra of the channel impulse response comprises computing Hadamard products of the similarity transforms and one-dimensional expansions of the WHT domain spectra of the channel impulse response.

2. The method of claim 1, wherein the transformation matrix reduces inter-symbol interference due to cross correlations between Walsh codes of the Walsh code multiplexed signal.

3. The method of claim 1, wherein calculating the transformation matrix further comprises converting the Hadamard products of the similarity transforms and the one-dimension expansions of the WHT domain spectra of the channel impulse response to the time domain and selecting resulting elements that correspond to the cyclic convolution of the data signal and the channel impulse response.

4. The method of claim 1, wherein the transformation matrix is inverted using a Sherman-Morrison algorithm.

5. The method of claim 4, wherein the transformation matrix is inverted using a noise covariance matrix as a seed for the Sherman-Morrison algorithm.

6. The method of claim 4, wherein the transformation matrix is inverted using a small diagonal matrix as a seed for the Sherman-Morrison algorithm.

7. The method of claim 4, wherein the transformation matrix is inverted by generating a series of one-dimensional expansions of the transformation matrix, and then iteratively solving the one-dimensional expansions as a set of simultaneous equations using the Sherman-Morrison algorithm.

8. A receiver configured to detect a symbol sequence contained in a received signal comprising a cyclic convolution of a Walsh code multiplexed signal and a channel impulse response of a multipath channel, the receiver comprising one or more processing circuits configured to:

calculate a transformation matrix that relates the Walsh Hadamard Transform (WHT) domain spectra of the data signal and the WHT domain spectra of the channel impulse response to the received signal; and estimate the symbol sequence as a function of the transformation matrix and the received signal, by inverting the transformation matrix and multiplying the received signal by the inverse of the transformation matrix;

wherein the one or more processing circuits are configured to calculate the transformation matrix by applying similarity transforms to the WHT domain spectra of the channel impulse response, wherein the similarity transforms relate the time domain cyclic convolution of the data signal and the channel impulse response to-a dyadic convolution of the data signal and the channel impulse response; and wherein the one or more processing circuits are configured to apply similarity transforms to the WHT domain spectra of the channel impulse response by computing Hadamard products of the similarity transforms and one-dimensional expansions of the WHT domain spectra of the channel impulse response.

9. The receiver of claim 8, wherein the transformation matrix is operative to reduce inter-symbol interference due to cross correlations between Walsh codes of the Walsh code multiplexed signal.

10. The receiver of claim 8, wherein the one or more processing circuits are further configured to calculate the transformation matrix by converting the Hadamard products of the similarity transforms and the one-dimensional expansions of the WHT domain spectra of the channel impulse response to the time domain and selecting resulting elements that correspond to the cyclic convolution of the data signal and the channel impulse response.

11. The receiver of claim 8, wherein the one or more processing circuits are configured to invert the transformation matrix using a Sherman-Morrison algorithm.

12. The receiver of claim 11, wherein the one or more processing circuits are configured to seed the Sherman-Morrison algorithm using a noise covariance matrix.

13. The receiver of claim 11, wherein the one or more processing circuits are configured to seed the Sherman-Morrison algorithm using a small diagonal matrix.

14. The receiver of claim 11, wherein the one or more processing circuits are configured to invert the transformation matrix by generating a series of one-dimensional expansions of the transformation matrix, and then iteratively solving the one-dimensional expansions as a set of simultaneous equations using the Sherman-Morrison algorithm.

* * * * *

UNITED STATES PATENT AND TRADEMARK OFFICE
CERTIFICATE OF CORRECTION

PATENT NO. : 7,869,546 B2
APPLICATION NO. : 11/067874
DATED : January 11, 2011
INVENTOR(S) : Tsai It is certified that error appears in the above-identified patent and that said Letters Patent is hereby corrected as shown below:

In Column 8, Line 13, delete "H." and insert -- H. --, therefor.

In column 11, lines 50-55, delete "[matrix $B^{(0)}$]" and insert -- [matrix $\mathbf{B}^{(0)}$] --.

In column 11, lines 58-65, delete "[matrix $B^{(1)}$]" and insert -- [matrix $\mathbf{B}^{(1)}$] --.

In column 12, lines 4-10, delete "[matrix $B^{(N/2)}$]" and insert -- [matrix $\mathbf{B}^{(N/2)}$] --.

In column 12, lines 14-20, delete "[matrix $B^{(N/2+1)}$]" and insert -- [matrix $\mathbf{B}^{(N/2+1)}$] --.

Signed and Sealed this
Eighth Day of November, 2011

David J. Kappos
*Director of the United States Patent and Trademark Office*

In Column 12, Line 63, delete "$\overline{\varpi}_i$" and insert --$\overline{\omega}_i$--, therefor.

In Column 12, Line 65, delete "$\overline{\varpi}_i$" and insert --$\overline{\omega}_i$--, therefor.

In Column 14, Line 51, in Claim 8, delete "to-a" and insert -- to a --, therefor.